Patented Nov. 3, 1931

1,829,961

UNITED STATES PATENT OFFICE

DIONIS E. MOLDOWAN, OF DETROIT, MICHIGAN

PROCESS OF EXTRACTING CULINARY OIL FROM SEEDS

No Drawing.   Application filed February 18, 1929.   Serial No. 341,031.

This invention relates to a process of extracting culinary oil from various kinds of seeds, such as sunflowers, pumpkin, hemp, or flax, and has for its object to produce a fine and healthy culinary oil.

In extracting culinary oil from seeds, the processes commonly used do not produce sufficient quantities of oil from a given amount of seeds to render the process practical and remunerative.

Instead of depending on filtering the oil from the seed material by press operations alone, I employ a roasting operation for eliminating the water content and for assisting the separation of the oil from the remaining residue.

The seeds to be used for the extraction of culinary oil are first dried, then sifted to remove any foreign substances, and then the seeds are rough ground to form a coarse granular mass. This dry granular mass is then sifted again to remove the coarser grains and husks that have remained. It is to be noted that the coarser grains, foreign substances, and husks are removed by the two operations of sifting, the remaining finer grains being then reground to form a fine flour mass. Then to the fine grain mass, a sufficient amount of warm water is added to create a mash, after which the mash is firmly kneaded for approximately three minutes. The kneading of the mash tends to thoroughly impregnate the cellulose walls of the granules of the mash with moisture. After this the mass of ground seeds in the form of a mash are roasted for approximately a total of fifteen minutes at a temperature of approximately 215° to 225° Fahrenheit, the roasting operation driving off the water content through the formation of steam. It is to be especially noted that the roasting of the fine granular mass of sifted and ground seeds, to which water has been added, is very important in my process for bringing out the oil, inasmuch as the roasting operation thereby causes the cellulose walls of the granules of the seed mass to crack and give up greater quantities of oil sufficient to insure the commercial success of said process. After the roasting operation, the roasted mass is compressed to separate the oil from the residue mass or seed pulp, after which the oil is put through a filter with no pressure, as the oil product is very rich and pure and will pass through the filter without the necessity of applying pressure thereto. With my process it is possible to obtain more oil from a given weight of seed, this amounting to approximately 25% of the initial weight of seeds in pure oil for culinary purposes.

The oil thus obtained by my process is a pure product which can be utilized for nearly all culinary purposes. The oil obtained gives a very satisfactory flavor to cooked foods in which it is used and provides a product with many health maintaining and medicinal qualities. Its laxative qualities make it a splendid ingredient for assisting normal foods to properly regulate the stomach and bowels.

I claim:

1. The process of extracting oil from seeds consisting of drying the seeds, subjecting the seeds to a plurality of grinding operations, each of said grinding operations successively reducing the seeds to an increasingly reduced size, sifting the seed particles before each of said grinding operations, impregnating the seed particles with water by kneading, heating the seed particles to a temperature above 212° F. to crack the seed particles, compressing the heated seed particles, and filtering the oil from the heated seed particles.

2. The process of extracting oil from seeds consisting of drying the seeds, subjecting the seeds to a plurality of grinding operations to successively reduce the seed particles to an increasingly reduced size, impregnating the seed with moisture, heating the seed particles to a temperature of approximately 215° F. to burst the cellulose structure of the seed particles, and separating the oil from the bursted seed particles.

3. The process of extracting oil from seeds consisting of subjecting the seeds to a plurality of grinding operations to successively reduce the seed particles to an increasingly reduced size, moistening the seed particles, kneading the moisture into the seed particles, and subjecting the seed particles to steam pressure, the steam pressure being generated within the structure of the seed particles.

Dearborn, Michigan, Feb. 16, 1929.

DIONIS E. MOLDOWAN